(12) United States Patent
Brinkman et al.

(10) Patent No.: US 8,352,851 B1
(45) Date of Patent: Jan. 8, 2013

(54) DECLARATIVE, NON-TRANSFORMATIONAL LAYOUT OF DATA

(75) Inventors: John P. Brinkman, Ottawa (CA); Adam Castrucci, Ottawa (CA); Darren Burns, Nepean (CA); Jeff Young, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1306 days.

(21) Appl. No.: 11/207,587

(22) Filed: Aug. 19, 2005

(51) Int. Cl.
*G06F 17/00* (2006.01)

(52) U.S. Cl. ........................ 715/227; 715/234

(58) Field of Classification Search .............. 715/244, 715/245, 251, 243, 253, 234, 221, 227; 707/752
See application file for complete search history.

(56) References Cited

U.S. PATENT DOCUMENTS

| | | | | |
|---|---|---|---|---|
| 6,704,906 B1* | 3/2004 | Yankovich et al. | ........... | 715/222 |
| 6,812,926 B1* | 11/2004 | Rugge | ............ | 345/440 |
| 7,237,188 B1* | 6/2007 | Leung | ............ | 715/209 |
| 7,430,713 B2* | 9/2008 | Kobashi et al. | ............ | 715/244 |
| 2002/0040376 A1* | 4/2002 | Yamanaka et al. | ............ | 707/530 |
| 2003/0055851 A1* | 3/2003 | Williamson et al. | ............ | 707/515 |
| 2006/0236230 A1* | 10/2006 | Lin et al. | ............ | 715/517 |
| 2007/0038928 A1* | 2/2007 | Marks et al. | ............ | 715/517 |

OTHER PUBLICATIONS

Mike MacGregor, "Tiering: The 5 W's", http://www.fftoday.com/articles/macgregor/tiering.htm, Jul. 2004.*
Archive for "Tiering: The 5 W's", http://web.archive.org/web/*/http://www.fftoday.com/articles/macgregor/tiering.htm.*
Mike MacGregor, "Tiering: The 5 W's", http://www.fftoday.com/articles/macgregor/tiering.html, Jul. 2004.*
Archive for "Tiering: The 5 W's", http://web.archive.org/web/*/http://www.fftoday.com/articles/macgregor/tiering.htm.*
XML Packages, http://xml.openoffice.org/package.html Archived Oct. 14, 2004.*

* cited by examiner

*Primary Examiner* — Adam M Queler
(74) *Attorney, Agent, or Firm* — Robert C. Kowert; Meyertons, Hood, Kivlin, Kowert & Goetzel, P.C.

(57) ABSTRACT

Briefly, in accordance with one embodiment of the invention, a form author may declaratively state a condition under which a break event may occur to insert a break between data items in a list of data items. Optionally, formatting, a leader subform, and/or a trailer subform may be inserted between the data items in the event the condition is satisfied. Such a declarative condition may be introduced into an XFA template specification. A condition that may be evaluated may include mathematical operation, a Boolean expression, an integer expression, a floating point expression, a string expression, and/or a data item evaluation. A new layout of the list of data items may be implemented without transformation of the original layout of the list of data items wherein the list of data items may revert to the original layout of the list of data items, for example after performing an operation on the new layout of the list of data items.

29 Claims, 3 Drawing Sheets

DECLARATIVE, NON-TRANSFORMATIONAL LAYOUT OF DATA

BACKGROUND

In records and data management, a file may include a list of data items in contiguous order, often organized, for example, in the form of records. At times, it may be desirable to present, display, print, and/or otherwise output the data in one or more alternative layouts based on a desired context. For example, in a list of employees that includes the departments the employees work in, it may be desirable to insert a break between the employee data items when the department name changes.

DESCRIPTION OF THE DRAWING FIGURES

Claimed subject matter is particularly pointed out and distinctly claimed in the concluding portion of the specification. However, both as to organization and/or method of operation, together with features, and/or aspects thereof, may best be understood by reference to the following detailed description when read with the accompanying drawings in which:

Figure 1:
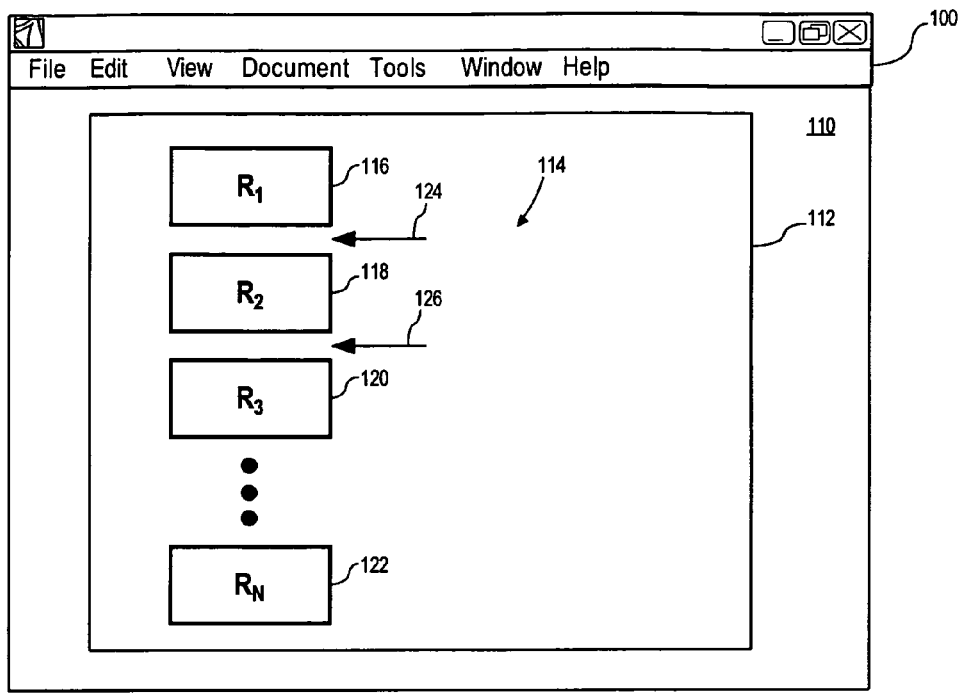
FIG. 1 is a diagram of a computer program to transform data at least in part in a declarative, non-transformative fashion in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system and/or computing platform, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include apparatuses for performing the operations herein. This apparatus may be specially constructed for the desired purposes, or it may comprise a general purpose computing device selectively activated and/or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like.

In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, content reflow may refer to where the contents of a document may be rearranged to alter the layout, order, and/or readability of the content of the document. In one or more embodiments, transient may refer to being in a state for a brief and/or temporary period of time, and/or passing with time and/or a temporary state of being. In one or more embodiments, an icon may refer to a smaller sized picture that may represent an object, a file, and/or a program, and in some embodiments, an icon may be a thumbnail, wherein a thumbnail may refer to a smaller sized image and/or picture of an object, a file, and/or a program, and/or a portion thereof. However, these are merely example definitions of terms relating to graphical user interfaces and/or computing platforms and/or the like, and the scope of claimed subject matter is not limited in this respect.

In one or more embodiments, a database may refer an organization of information created, stored, accessed, edited, and/or otherwise utilized by a computing platform. In one or more embodiments, a tag may refer to a command contained in a file, object, and/or document that may specify how the file, object, and/or document, and/or a portion thereof, may be formatted. In one or more embodiments, metadata may refer to information pertaining to data contained in a file, object, and/or document, for example formatting information, date of creation, date of editing, date saved, how data was obtained, and/or from where data was obtained. Such metadata, for example, may be utilized in for database management purposes and/or for data warehousing of multiple databases, although the scope of claimed subject matter is not limited in this respect. In one or more embodiments, an application programming interface (API) may refer to a set of routines, protocols, and/or tools utilized to cause a program to operate in conjunction with an operating system. In one or more embodiments, an operating system may refer to a program to execute on a computing platform to handle input and/or output commands, file management, printing, displaying, storing, and/or communicating of information for the computing platform. However, these are merely examples of database and/or operating system functions, and the scope of claimed subject matter is not limited in these respects.

Referring now to FIG. 1, a diagram of a computer program to transform data at least in part in a declarative, non-transformative fashion in accordance with one or more embodiments will be discussed. As shown in FIG. 1, computer program 100 may include graphical user interface 110 to display file 112 that may include list 114 of records and/or data items, where the records and/or data items may include first record 116, second record 118, up to N number of records and/or data items ending with Nth record 122 in list 114. One or more of the records and/or data items may include data, which may be no data and/or a single datum, where the data may be represented in one or more fields. In one or more embodiments, computer program 100 may be, for example, such as Adobe® Acrobat® 7.0 Professional, Adobe® Acrobat® 7.0 Standard, Adobe® InDesign® CS2, Adobe® FrameMaker® 7.1, available from Adobe Systems Incorporated of San Jose, Calif., USA, and/or any other suitable computer program product available from Adobe Systems Incorporated or the like type of computer program product. In general, computer program 100 may be any suitable computer program product able to render, print, manipulate, display, and/or otherwise output data contained in list 114 of file 112 or the like, for example using records and/or data items such as record 116, record 118, and/or up to record 122 to contain the data. In one or more embodiments, a record may include one or more fields in which a datum and/or data may be entered and/or stored. In one or more embodiments, a field may refer to unit and/or space into which a datum and/or data may be stored. However, these are merely examples of elements that may be utilized for entering, storing, and/or organizing data, and the scope of the claimed subject matter is not limited in these respects. In general, file 112 may comprise a list 114 of data items, which may be for example data lines having an associated datum and/or data, and such data items may be arranged and/or organized using various structures such as lists, fields, records, objects, and so on, however the scope of the claimed subject matter is not limited in these respects. In one or more embodiments, a subform may refer to information, formatting, and/or a command that may be inserted between data items, for example, page breaks, leaders, trailers, returns, spaces, sections breaks, and so on, however the scope of the claimed subject matter is not limited in this respect.

In one or more embodiments, a break such as break 124 between records and/or data items may be inserted between record 116 and record 118, for example for providing a desired layout for printing, displaying, and/or otherwise outputting list 114. Such a break and/or subforms may be conditionally inserted between data items based at least in part on one data item satisfying a condition, and/or a comparison between a data item and at least one or more other data items satisfying a condition. Likewise, a break such as break 126 may appear between record 116 and record 118, for example for providing a desired layout for printing, displaying, and/or otherwise outputting list 114. In one or more embodiments, such a break and/or breaks may be transitory for such that a layout resulting there from may not transform the original data contained in file 112 and/or the records and/or data items, at least in part. For example, in accordance with one or more embodiments, a user using program 100 may generate a layout of file 112 and/or the records and/or data items for purposes of printing and/or displaying. When a desired printing and/or displaying operation is completed, the layout of file 112 and/or the records and/or data items may preserve the original data of file 112 without changing the data. Such generating, at least in part, of the layout of file 112 while preserving the original data, in one or more embodiments, may be referred to as a non-transformational layout and/or formatting of the data contained in file 112 and/or the records and/or data items of file 112. However, such generating at least in part a particular layout of data, without transforming the data, of a file and/or the records and/or data items contained in the file is merely one example of a non-transformational layout of information, and the scope of the claimed subject matter is not limited in this respect.

Figure 2:
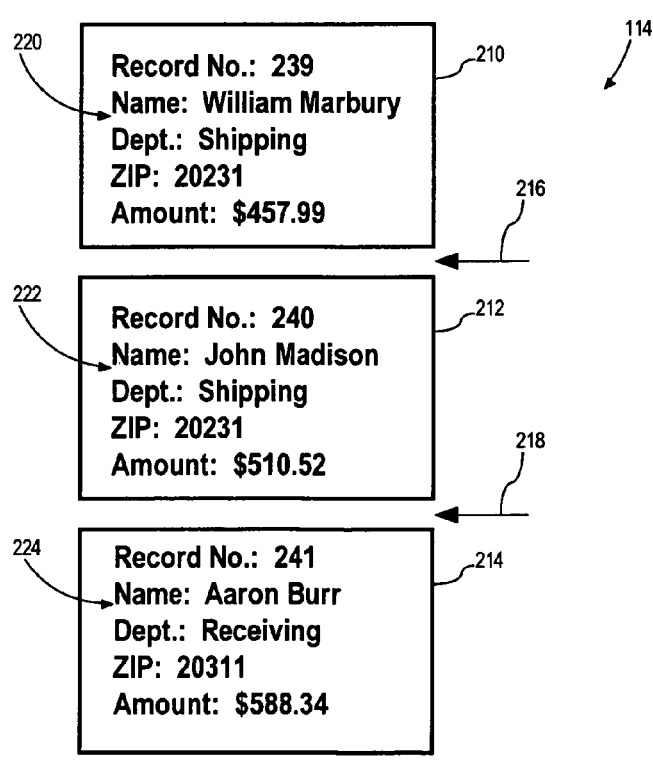
FIG. 2 is a diagram of a list having data that may be transformed at least in part in a declarative, non-transformative fashion that may in accordance with one or more embodiments.

Referring now to FIG. 2, a diagram of a list having data that may be transformed at least in part in a declarative, non-transformative fashion that may in accordance with one or more embodiments, will be discussed. As shown in FIG. 2, list 114 may include one or more records and/or data items such as record 210, record 212, and/or record 214. Record 210 may include one or more fields 220, record 212 may include one or more fields 223, and/or record 214 may include one or more fields 224. In the example shown in FIG. 2, fields 220, fields 222, and/or fields 224 may include a record number field with a number as field data, a name field with a name as field data, a department field with a department as field data, a ZIP code and/or a postal code field as field data, and/or an amount field having a dollar amount as field data. However, these are merely examples of the types of fields that may be contained in a given record and/or data item, and the scope of the claimed subject matter is not limited in this respect. In accordance with one or more embodiments, it may be desirable to conditionally insert a break between records and/or data items upon satisfaction of a condition, for example, when a dollar amount exceeds a given predetermined value such as $500. Thus, in such an example, break 216 may be inserted between record 220 and record 222 since the dollar amount, $457.99, in the amount field of record 220 is less than $500, but the dollar amount, $510.52, in the amount field of record 22 is greater than $500. In an alternative example, it may be desirable to conditionally insert a break between records and/or data items, for example, when the running total dollar amount of consecutive fields, when added together, exceeds a predetermined value such as $900. Thus, in such an example, break 218 may be inserted between record 222 and 224 since the total of the dollar amount, $457.99, in record 220 and the dollar amount, $510.52, in record 222 results in a sum of $968.51, which is greater than $900. In another example, it may be desirable to conditionally insert a break between records and/or data items, for example, after every tenth record. Thus, in such an example, break 218 may be inserted between record 222 and record 224 since record 222 is record number 240. As yet another example, it may be desirable to conditionally insert a break between records and/or data items, for example, when the data in the department field changes from one department to another second department. In such an example, break 218 may be inserted between record 222 and record 224 since the department name changes from shipping in record 222 to receiving in record 224. As yet another example, it may be desirable to conditionally insert a break between records and/or data items when the forward sortation area (FSA) of the zip code field, or generically of a postal code field, has changed from one record to the next, where the FSA is the first three numbers and/or characters of a postal code. Thus, in such an example, break 218 may be inserted between record 222 and record 224 since the FSA of the zip code field of record 222 is 202, and the FSA of the zip code field of record 224 is 203. In such examples given for when it may be desirable to conditionally insert a break between records and/or data items, such a determination of when and/or where to insert a break may be based at least in part on a comparison of data in one field of a record with the data in at least one or more other records and/or data items, and/or alternatively based on an evaluation of a single data item satisfying a predetermined condition. Such a comparison may comprise, for example, mathematical operation, a Boolean expression, an integer expression, a floating point expression, a string expression, and/or a data item evaluation such as discussed in the above examples. Furthermore, other types of comparisons may be utilized, for example, a fuzzy logic type operation, a rules based type operation, an expert system type operation, and so on, and the scope of the claimed subject matter is not limited in these respects.

Figure 3:
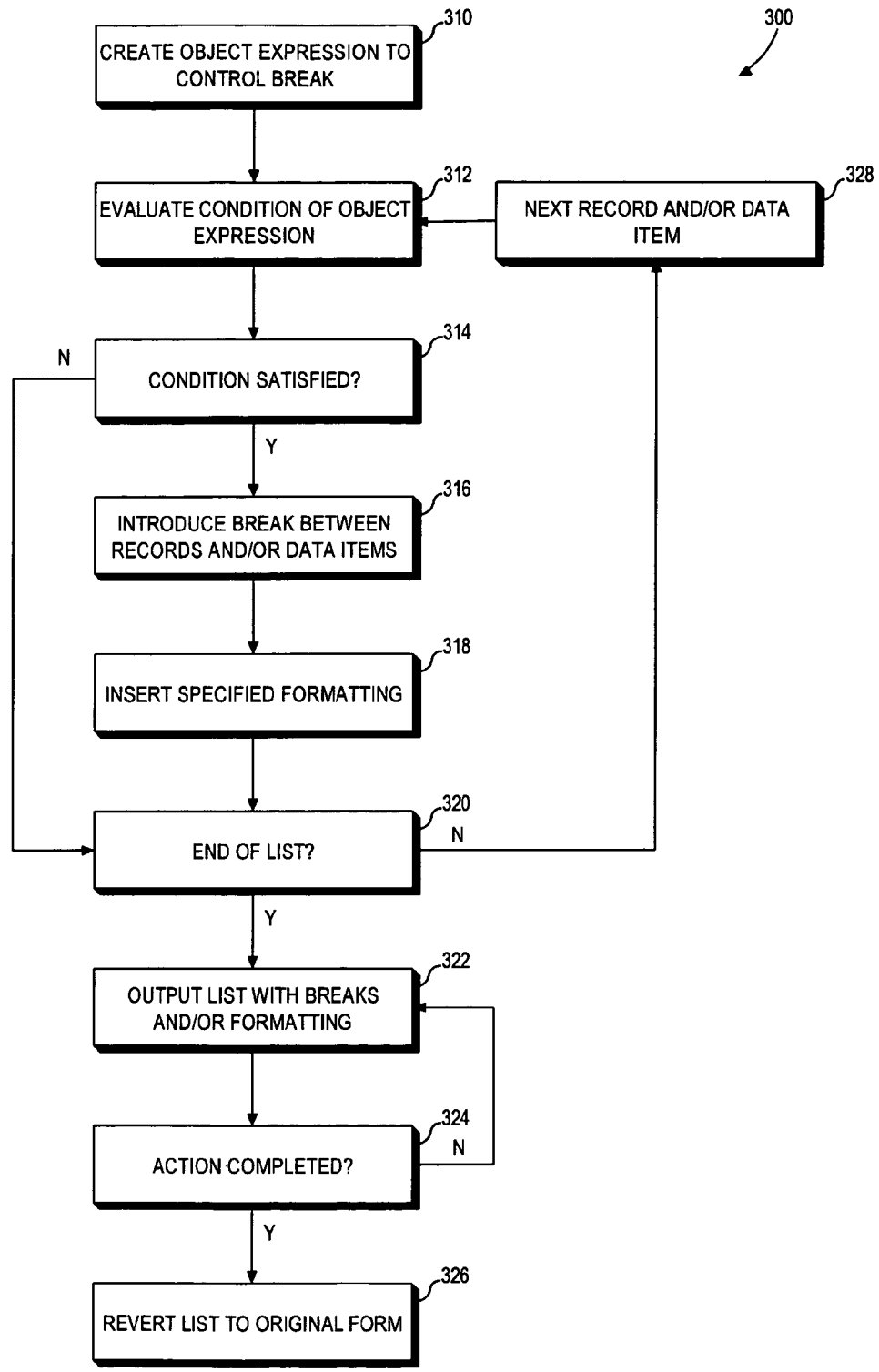
FIG. 3 is a flow diagram of method by which data may be transformed at least in part in a declarative, non-transformative fashion in accordance with one or more embodiments.

Referring now to FIG. 3, a flow diagram of method by which data may be transformed at least in part in a declarative, non-transformative fashion in accordance with one or more embodiments will be discussed. FIG. 3 depicts one example order of the blocks of method 300, however method 300 is not necessarily limited to the particular order of the blocks as shown in FIG. 3 wherein the blocks of method 300 may occur in one or more other orders, and the scope of the claimed subject matter is not limited in this respect. Likewise, method 300 may comprise more or fewer blocks than shown in FIG. 3, and the scope of the claimed subject matter is not limited in this respect. In one or more embodiments, an expression, which may be an object expression, to control a break between records and/or data items may be created at block 310. A condition of the expression may be evaluated, at block 312, for example between the data of a first record and the data of a second record. In one or more embodiments, a user may declare a condition and/or conditions under which a break may be inserted into list 114, which may be referred to as a declarative condition upon which data of file 112 may be output in a new layout. A determination may be made at block 314 whether the condition of the expression is satisfied. In the event the condition is satisfied, a break may be introduced between the records and/or data items at block 316. Optionally, at block 318, one or more specified formatting elements and/or subforms may be inserted at and/or nearby the section break. For example, a section break may be inserted between the records and/or data items, and a predetermined number of lines and/or returns may be inserted between the records and/or data items after the first record and/or before the second record. Likewise, a section break may be specified as page break, and/or a page break may be inserted between the records and/or data items in addition to the section break. Other types of formatting may be inserted as well, for example, the insertion of a leader record, a trailer record, a break to a new page and/or to a new content area, and/or new content may be inserted at and/or near the inserted break, and the scope of the claimed subject matter is not limited in this respect. It should be noted block 316 and/or block 318 may be optional such that the introduction of breaks and/or formatting may be handled by block 322 at least in part, wherein block 316 and/or block 318 may not be required in at least one or more embodiments, although the scope of the claimed subject matter is not limited in this respect.

At block 320, a determination may be made whether the end of the list of data items, such as list 114, is reached. Block 320 may also be executed in the event the condition of the expression at block 314 is not satisfied. In the event the end of the list is not yet reached, method 300 may continue with the next record at block 328 to subsequently evaluate the condition of the expression at block 312. In the event it is determined that the end of the list is reached, and/or any other condition that may be set to cease evaluation of the object condition at block 312, the list, such as list 114, may be output with the inserted breaks and/or the optionally inserted formatting. For example, such output at block 322 may include rendering the list, displaying the list, printing the list, transmitting the list, saving the list, and so on, in a new layout that includes at least in part the inserted breaks and/or the optionally inserted formatting. When an action of such output is completed, for example after printing of the list in the new layout, the list may revert to an original form at block 326, although the scope of the claimed subject matter is not limited in this respect. In one or more embodiments, method 300 may be implemented using Adobe® PostScript® and/or any other similar type of language, for example to provide a layout for printing, although the scope of the claimed subject matter is not limited in this respect. In one or more embodiments, block 326 may be optional and/or not included in method 300. In such embodiments, the original list of data in file 112 may be a binary data file having no formatting and/or breaks inserted. In processing the data for output at block 322, the data may be read as part of execution of method 328 for generating a new file and/or copy of file 112 that includes one or more breaks and/or formatting. Such a new file may be saved, printed, displayed, stored, and so on, optionally without affecting, at least in part, the original data of file 112, although the scope of the claimed subject matter is not limited in this respect.

In one or more embodiments, a conditional expression, such as evaluated at block 312, may include a conditional break statement, <conditionalBreak>, which may be defined, for example, via modification of an Extensible Markup Language (XML) Forms Architecture (XFA) template specification statement. In one or more embodiments, such a conditional break statement may be similar to a break statement, <break>, but a conditional break statement but may be controlled by script. Such a conditional break statement, which may be referred to as a Break on Change Event, in one or more embodiments, may be a script or script like process that may execute in the event it is desired to test for a record/field value change from one record to another record. By making the conditional break statement a scriptable and/or a script like event, more complex changes in the data of one or more records and/or data items may be tested as a conditional event, for example in the evaluation of a condition of an expression at block 312.

In one or more embodiments, such conditional break processing, such as the evaluation at block 312, may comprise any one or more of the following: to determine whether a break should occur, to optionally insert a leader subform, and/or to optionally insert a trailer subform. In one embodiment, these three processing events may occur, and in one or more alternative embodiments, fewer than and/or greater than these three processing events may occur, and the scope of the claimed subject matter is not limited in these respects.

In one or more embodiments, a break element, <break>, may be expanded with the following attributes:
    <break leader="#L1 #L2 #L3 . . . "
      trailer="#T1 #T2 #T3 . . . ">

In one or more embodiments, a leader may refer a space delimited list of subform identifications (IDs) to be laid down before the enclosing subform, <subform>. An empty string may be a default. In one or more embodiments, a trailer may refer to a space delimited list of subform identifications (IDs) to be laid down after the enclosing subform, <subform>. An empty string may be a default. In addition, a conditional break element, <conditionalBreak>, may be provided. The conditional break element may be substantially similar to a break element, <break>, except that it will be a 0 . . . n child instead of 0 . . . 1, and in addition the conditional break element, <conditionalBreak>, may support a' script child, <script>. The script child, <script>, may be substantially similar and/or identical to script children in other contexts, for example under calculate, <calculate>, although the scope of the claimed subject matter is not limited in this respect. An example of a conditional break element may appear as:

```
<conditionalBreak leader="#L1 #L2 #L3 . . . "
    trailer="#T1 #T2 #T3 . . . ">
  <script> Postal_Code.value ne Postal_Code [-1] .value </script>
</conditionalBreak>
```

In one or more embodiments, the script, if specified, may be executed in a context of the current subform. If the script is specified, is non-empty, and returns TRUE, or a non-zero number, then the in such an embodiment the conditional break element, <conditionalBreak>, may behave identically to a break element, <break>. Otherwise, the conditional break element, <conditionalBreak>, may have no effect. In one or more embodiments, an exception and/or a syntax error may be considered to be FALSE, although the scope of the claimed subject matter is not limited in this respect.

In one or more embodiments, the break element, <break>, and the conditional break element, <conditionalBreak>, may be symmetrical wherein the break element, <break>, may be equivalent to a conditional break element, <conditionalBreak>, when the script returns TRUE, although the scope of the claimed subject matter is not limited in this respect. For example:

```
<subform name="detail_line">
  <occur min="0" max="-1"
  <conditionalBreak beforeTarget="#PAGE"
      before="pageArea">
    <script> Postal_Code.value ne Postal_Code [-1] .value </script>
  </conditionalBreak>
  <field name="Postal_Code">
    . . .
  </field>
</subform>
```

In this case, the script may cause a forced break to occur when the value of the Postal_Code field changes between consecutive detail lines. Such a break will not be invoked when the script returns FALSE, where Postal_Code value remains unchanged. In such an arrangement, it is possible to have conditional breaks that occur upon on a user provided condition. If the script is not specified, or is an empty string, then the script may be treated as if it returned FALSE, meaning the break does not occur, although the scope of the claimed subject matter is not limited in this respect.

The specification of either a leader and/or a trailer may indicate such a leader and/or trailer subform may be inserted before and/or after a subform break occurs. The value may be a space delimited list of identifications (IDs) such that the occur values will be used to determine what leaders and/or trailers are available as the list is processed from left to right. In such an arrangement, it is possible to specify subforms to insert between subforms as desired. When used in conjunction with a conditional break, <conditionalBreak>, the user may have control over whether a break is to occur, and optionally to insert subforms before and/or after the break, although the scope of the claimed subject matter is not limited in this respect.

In one or more embodiments, for example, a user may desire to insert a break between detail lines with different Postal_Code values, to leave a trailer subform before leaving the old page at a page break, and/or to start a leader on the new page following the page break, although the scope of the claimed subject matter is not limited in this respect. Such an event may be defined as follows:

```
<subform name="detail line">
    <occur min="0" max="-1"
    <conditionalBreak        beforeTarget="#PAGE"
                             before="pageArea"
                             leader="#L1"
                             trailer="#T1">
        <script>Postal_Code.value ne Postal_Code [-1] .value </script>
    </conditionalBreak>
    <field name="Postal_Code">
        ...
    <field>
</subform>
```

Assuming the resulting form model looks like:
    detail_line [0]
        Postal_Code ("K2M 2P1")
    detail_line [1]
        Postal_Code ("K2M 2P1")
    detail_line [2]
        Postal_Code ("K4L 6P8")
    detail_line [3]
        Postal_Code ("K4L 6P8")
then the resulting layout would be:

| Page 1: | detail_line [0] | (K2M 2P1) |
|---|---|---|
|  | detail_line [1] | (K2M 2P1) |
|  | T1 |  |
| Page 2: | L1 |  |
|  | detail_line [2] | (K4L 6P8) |
|  | detail_line [3] | (K4L 6P8) |

In this embodiment, detail_line [2] had a beforeTest process evaluate to a change in value which caused the break to new page. This also resulted in the beforeLeader[Trailer] subforms being inserted. The afterTest may behave similarly except it may occur during a resolution of break.after*, although the scope of the claimed subject matter is not limited in this respect. In an alternative embodiment, a user may desire to insert a subform between detail lines with different Postal_Code values, but does not desire to break to a new contentArea and/or new pageArea, although the scope of the claimed subject matter is not limited in this respect. Such an example may be defined as follows:

```
<subform name="detail_line">
    <occur min="0" max="-1"
    <break beforeTest="Postal_Code.value"
        beforeLeader="#L1"/>
    <field name="Postal_Code">
        ...
    </field>
</subform>
```

Assuming the same form model as the example, above, the resulting layout would be:

| Page 1: | detail_line [0] |
|---|---|
|  | detail_line [1] |
|  | L1 |
|  | detail_line [2] |
|  | detail_line [3] |

Figure 4:
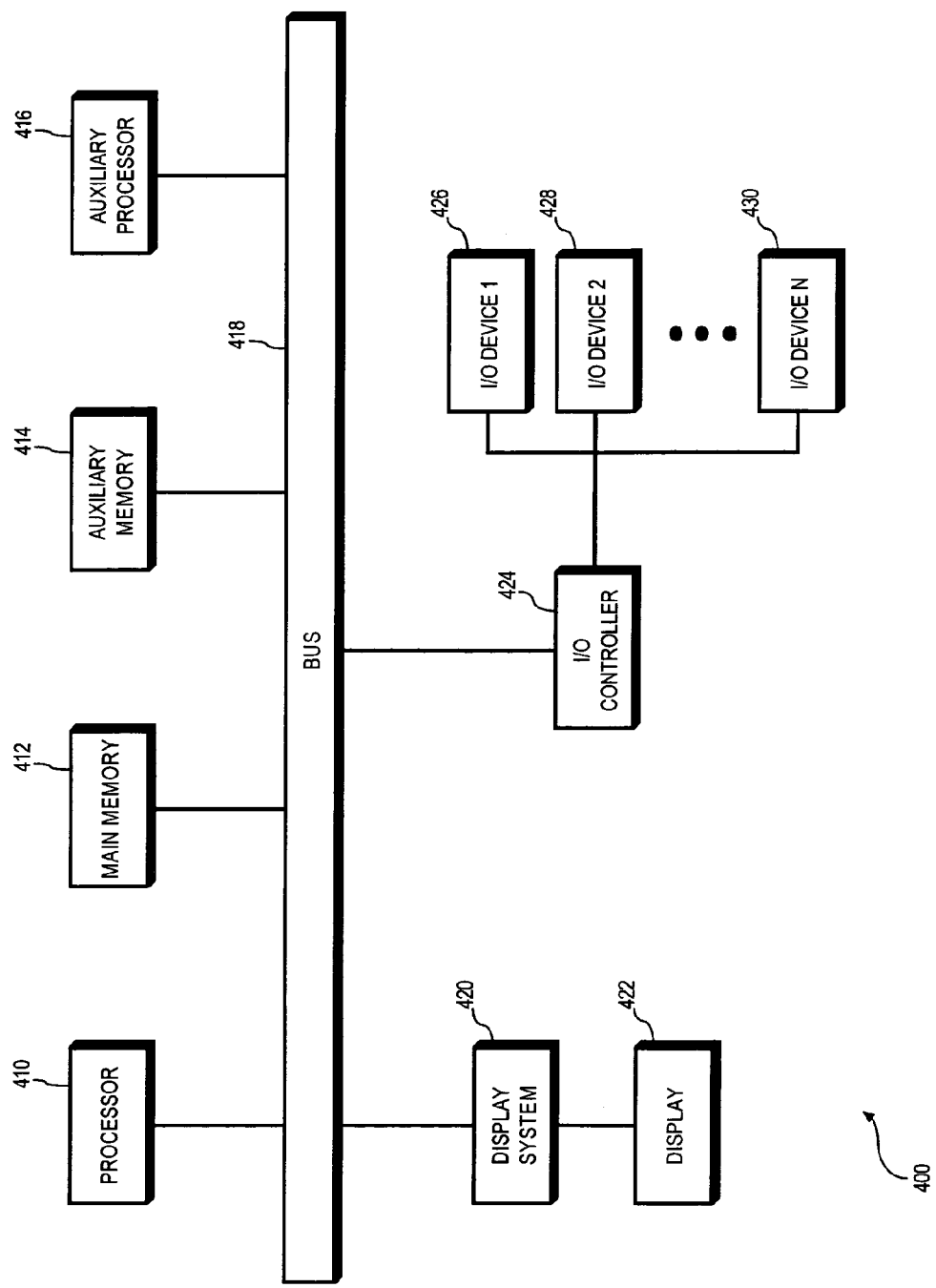
FIG. 4 is a block diagram of an information handling system able to transform data at least in part in a declarative, non-transformative fashion in accordance with one or more embodiments.

Referring now to FIG. 4, a block diagram of an information handling system able to transform data at least in part in a declarative, non-transformative fashion in accordance with one or more embodiments will be discussed. Information handling system 400 may be utilized to tangibly embody computer program 100 and/or graphical user interface 110 of FIG. 1 by providing hardware components on which computer program 100 and/or graphical user interface 110 may be executed, for example to execute method 300 of FIG. 3. Such a computer program and/or machine readable instructions may be tangibly stored on a computer and/or machine readable medium such as a compact disk (CD), digital versatile disk (DVD), flash memory device, hard disk drive (HDD), and so on. As shown in FIG. 4, information handling system 400 may be controlled by processor 410. Processor 410 may comprise a central processing unit such as a microprocessor or microcontroller for executing programs, performing data manipulations and controlling the tasks of information handling system 400. Communication with processor 400 may be implemented via bus 418 for transferring information among the components of information handling system 400. Bus 418 may include a data channel for facilitating information transfer between storage and other peripheral components of information handling system 418. Bus 418 further may provide a set of signals utilized for communication with processor 410, including, for example, a data bus, and address bus, and/or a control bus. Bus 418 may comprise any bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of information handling system may include, for example, main memory 412, and/or auxiliary memory 414. Information handling system 400 may further comprise auxiliary processing processor 416, which may be another processor, a digital signal processor, and so on. Main memory 412 may provide storage of instructions and data for programs to be executed by processor 410. Main memory 412 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferroelectric random access memory (FRAM), and so on. Auxiliary memory 412 may be utilized to store instructions and/or data that to be loaded into main memory 412 before execution. Auxiliary memory 414 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 414 may also include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Information handling system 400 optionally include auxiliary processor 416 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any slave type processor subordinate to processor 410, an additional microprocessor and/or controller for dual and/or multiple processor systems, and/or a coprocessor and/or additional processor. Such auxiliary processors may be discrete processors and/or or may be arranged in the same package as processor 410, for example in a multicore and/or multithreaded processor, however the scope of the claimed subject matter is not limited in these respects.

Information handling system 400 further may include display system 420 for connecting to display 422, and further may include input/output (I/O) controller 424 to connect to one or more I/O devices including, for example, I/O device 426, I/O device 428, up to an Nth I/O device, I/O device 430. Display system 420 may comprise a video display adapter having components for driving display 422, including, for example, video memory, a buffer, and/or a graphics engine. Such video memory may be, for example, video random access memory (VRAM), synchronous graphics random access memory (SGRAM), windows random access memory (WRAM), and/or the like. Display 422 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 424 may comprise one or more controllers and/or adapters to prove interface functions between one or more of I/O device 426, I/O device 428, and/or I/O device 430. For example, input/output controller 424 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like. Input/output controller 424 and/or I/O device 426, I/O device 428, and/or I/O device 430 may provide and/or receive analog and/or digital signals to communicate between information handling system and external devices, networks, and/or information sources. Input/output controller 424 and/or I/O device 426, I/O device 428, and/or I/O device 430 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Information handling system 400 of FIG. 4 is merely one example of an information handling system and/or computing platform, and the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that declarative, non-transformational layout of data and/or many of its attendant advantages will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    creating a declarative expression that is part of a markup language definition of a template for an electronic form, wherein the declarative expression is defined in the markup language and controls the insertion of one or more breaks between data items in a list of data items to be received in the electronic form without transforming the data items, wherein the declarative expression includes a conditional break statement indicating a condition under which one of the one or more breaks is inserted when the condition is satisfied, wherein the condition is based at least in part on values of at least two of the data items in the list of data items;
    receiving a first list of data items for the form and creating the form, wherein creating the form comprises:
        evaluating the condition of the declarative expression in the markup language for the template for the form, wherein the condition is evaluated dependent on values of the first list of data items; and
        in response to the condition of the declarative expression being satisfied, inserting one of the one or more breaks between two data items of the first list of data items in the electronic form without performing a separate transformation of the data items.

2. A method as claimed in claim 1, wherein said evaluating includes executing a script to evaluate the condition of the declarative expression.

3. A method as claimed in claim 1, further comprising inserting at least one subform between the two data items in the event the condition of the declarative expression is satisfied.

4. A method as claimed in claim 1, further comprising inserting at least one of a leader subform or a trailer subform between the two data items in the event the condition of the declarative expression is satisfied.

5. A method as claimed in claim 1, further comprising outputting the first list without transforming the data items in the first list.

6. A method as claimed in claim 1, wherein the one or more breaks comprises at least one of a space, a return, a page break, or a section break.

7. A method as claimed in claim 1, further comprising, in the event of the condition of the declarative expression being satisfied, inserting a sub form between the two data items without inserting the break between the two data items.

8. A method as claimed in claim 1, wherein the condition of the declarative expression comprising at least one of a mathematical operation, a Boolean expression, an integer expression, a floating point expression, a string expression, or a data item evaluation.

9. A method as claimed in claim 1, wherein said evaluating comprises comparing one data item with at least one other data item from said first list of data items.

10. A method as claimed in claim 1, further comprising determining a running total of numeric values for a plurality of the data items.

11. A method as claimed in claim 10, wherein said condition is satisfied if said running total exceeds a particular value.

12. An article of manufacture comprising a storage medium having stored thereon instructions that, if executed by a computing platform, direct said computing platform to:
create a declarative expression that is part of a markup language definition of a template for an electronic form, wherein the declarative expression is defined in the markup language and controls the insertion of one or more breaks between data items in a list of data items to be received in the electronic form without transforming the data items, wherein the declarative expression includes a conditional break statement indicating a condition under which one of the one or more breaks is inserted when the condition is satisfied, wherein the condition is based at least in part on values of at least two of the data items in the list of data items;
receive a first list of data items for the form and create the form, wherein creating the form comprises:
evaluating the condition of the declarative expression in the markup language for the template for the form, wherein the condition is evaluated dependent on values of the first list of data items; and
in response to the condition of the declarative expression being satisfied, inserting one of the one or more breaks between two data items of the first list of data items in the electronic form without performing a separate transformation of the data items.

13. An article of manufacture as claimed in claim 12, wherein said instructions, if executed by said computing platform, further direct said computing platform to evaluate the condition of the declarative expression by executing a script to evaluate the condition of the expression.

14. An article of manufacture in claim 12, wherein the instructions, if executed by said computing platform, further direct said computing platform to insert at least one subform between the two data items in the event the condition of the declarative expression is satisfied.

15. An article of manufacture as claimed in claim 12, wherein the instructions, if executed by said computing platform, further direct said computing platform to insert at least one of a leader subform or a trailer subform between the two data items in the event the condition of the declarative expression is satisfied.

16. An article of manufacture as claimed in claim 12, wherein the instructions, if executed by said computing platform, further direct said computing platform to output the first list without transforming the data items in the first list.

17. An article of manufacture as claimed in claim 12, wherein the one or more breaks comprises at least one of a space, a return, a page break, or a section break.

18. An article of manufacture as claimed in claim 12, wherein the instructions, if executed by said computing platform, further direct said computing platform to, in the event of the condition being satisfied, insert a subform between the two data items without inserting the break between the two data items.

19. An article of manufacture as claimed in claim 12, wherein the condition of the declarative expression includes at least one of mathematical operation, a Boolean expression, an integer expression, a floating point expression, a string expression, or a data item evaluation.

20. An article of manufacture as claimed in claim 12, said evaluating comprising comparing one data item with at least one other data item from said first list of data items.

21. An apparatus, comprising:
at least one processor; and
a memory comprising program instructions, wherein the program instructions are executable by the at least one processor to:
create a declarative expression which is part of a markup language definition of a template for an electronic form, wherein the declarative expression is defined in the markup language and controls the insertion of one or more breaks between data items in a list of data items to be received in the electronic form without transforming the data items, wherein the declarative expression includes a conditional break statement indicating a condition under which one of the one or more breaks is inserted when the condition is satisfied, wherein the condition is based at least in part on values of at least two of the data items;
receive a first list of data items for the form and creating the form, wherein creating the form comprises:
evaluating the condition of the declarative expression in the markup language for the template for the form, wherein the condition is evaluated dependent on values of the first list of data items; and
in response to the condition of the declarative expression being satisfied, inserting one of the one or more breaks between two data items of the first list of data items in the electronic form without performing a separate transformation of the data items.

22. An apparatus as claimed in claim 21, wherein said evaluating includes executing a script to evaluate said condition of the declarative expression.

23. An apparatus as claimed in claim 21, wherein the program instructions are further executable by the at least one processor to insert at least one subform between the two data items in the event the condition of the declarative expression is satisfied.

24. An apparatus as claimed in claim 21, wherein the program instructions are executable by the at least one processor to insert at least one of a leader subform or a trailer subform between the two data items in the event the condition of the declarative expression is satisfied.

25. An apparatus as claimed in claim 21, wherein the program instructions are executable by the at least one processor to output the first list without transforming the data items in the first list.

26. An apparatus as claimed in claim 21, wherein the one or more breaks comprises at least one of a space, a return, a page break, or a section break.

27. An apparatus as claimed in claim 21, wherein the program instructions are executable by the at least one processor to insert a subform between the two data items without inserting the break between the two data items in the event of the condition being satisfied.

28. An apparatus as claimed in claim 21, wherein the condition of the declarative expression comprises at least one of mathematical operation, a Boolean expression, an integer expression, a floating point expression, a string expression, or a data item evaluation.

29. An apparatus as claimed in claim 21, wherein said evaluating includes comparing one data item with at least one other data item from said first list of data items.

* * * * *